United States Patent
Earl et al.

(10) Patent No.: US 9,486,918 B1
(45) Date of Patent: Nov. 8, 2016

(54) SYSTEM AND METHOD FOR QUICK SCRIPTING OF TASKS FOR AUTONOMOUS ROBOTIC MANIPULATION

(71) Applicant: HRL Laboratories, LLC, Malibu, CA (US)

(72) Inventors: Darren J. Earl, Los Angeles, CA (US); Derek W. Mitchell, Calabasas, CA (US); Heiko Hoffmann, Simi Valley, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 14/207,519

(22) Filed: Mar. 12, 2014

Related U.S. Application Data

(60) Provisional application No. 61/780,903, filed on Mar. 13, 2013.

(51) Int. Cl.
*B25J 9/16* (2006.01)

(52) U.S. Cl.
CPC .................................. *B25J 9/163* (2013.01)

(58) Field of Classification Search
CPC ............ B25J 9/163; B25J 9/10–9/101; B25J 9/1015; B25J 9/1055; B25J 9/1602–9/161; B25J 9/1628–9/1633; B25J 9/1638; B25J 9/1656; B25J 9/1669; B25J 9/1674–9/1679; B25J 9/1694–9/1697; B25J 13/08; B25J 13/084; B25J 13/085; B25J 13/088–13/089; G05B 19/0425; G05B 19/0428; G05B 19/045; G05B 19/05; G05B 19/19; G05B 19/402–19/4061; G05B 19/408–19/4086; G05B 19/4155; G05B 2219/39082; G05B 2219/39085; G05B 2219/39178; G05B 2219/39183; G05B 2219/39188; G05B 2219/39189; G05B 2219/39266; G05B 2219/39364; G05B 2219/39536; G05B 2219/39547; G05B 2219/39573; G05B 2219/40629; G05B 2219/40501; G05B 2219/40507; G05B 2219/40518; G05B 2219/40523; G05B 2219/40519; G05B 2219/40419; G05B 2219/40477; G05B 2219/40444; G05B 2219/40393; G05B 2219/40395; G05B 2219/40105; G05B 2219/40113; G05B 2219/40115; G05B 2219/4095; G05B 2219/393774; B62D 57/028; G06N 3/008

See application file for complete search history.

(56) References Cited

U.S. PATENT DOCUMENTS 4,786,847 A * 11/1988 Daggett et al. ............ 318/568.2
4,868,474 A * 9/1989 Lancraft et al. ........... 318/568.2

(Continued)

OTHER PUBLICATIONS

H Hoffmann, P Pastor, D-H Park, and S Schaal. Bielogicaily-inspired dynamical systems for movement generation: Automatic real-time goal adaptation and obstacle avoidance. IEEE International Conference on Robotics and Automation, 2009.

(Continued)

*Primary Examiner* — Bao Long T Nguyen
(74) *Attorney, Agent, or Firm* — Tope-McKay & Associates

(57) ABSTRACT

Described is a system for a system for autonomous robotic manipulation. The system is configured to receiving a selected task from a task file library. The task is associated with causing a robot end effector to perform an action with a particular item, such as picking up an item. The selected task is transformed into a state machine. Thereafter, the system executes the state machine and, in doing so, causes the robot end effector to perform the selected task.

20 Claims, 5 Drawing Sheets

(56) References Cited

U.S. PATENT DOCUMENTS

| | | | | |
|---|---|---|---|---|
| 4,990,838 | A * | 2/1991 | Kawato | B25J 9/161 318/568.13 |
| 5,758,298 | A * | 5/1998 | Guldner | 701/23 |
| 7,383,100 | B2 * | 6/2008 | Ng-Thow-Hing | B62D 57/028 318/568.1 |
| 7,684,892 | B2 * | 3/2010 | Yuan et al. | 700/181 |
| 7,689,320 | B2 * | 3/2010 | Prisco et al. | 700/245 |
| 7,853,358 | B2 * | 12/2010 | Joly | 700/260 |
| 8,204,623 | B1 * | 6/2012 | Bhattacharyya | B25J 9/1666 700/1 |
| 8,965,580 | B2 * | 2/2015 | Brooks | B25J 9/0087 345/629 |
| 2003/0066050 | A1 * | 4/2003 | Wang et al. | 717/105 |
| 2004/0243281 | A1 * | 12/2004 | Fujita et al. | 700/245 |
| 2007/0255454 | A1 * | 11/2007 | Dariush | G06N 3/008 700/245 |
| 2008/0058988 | A1 * | 3/2008 | Chung et al. | 700/258 |
| 2008/0147238 | A1 * | 6/2008 | Joly | G05B 19/237 700/260 |
| 2011/0190932 | A1 * | 8/2011 | Tsusaka | B25J 13/08 700/254 |
| 2011/0270444 | A1 * | 11/2011 | Nagata | G05B 19/401 700/258 |
| 2012/0010772 | A1 * | 1/2012 | Pack et al. | 701/27 |
| 2012/0095619 | A1 * | 4/2012 | Pack et al. | 701/2 |
| 2013/0245829 | A1 * | 9/2013 | Ohta | B25J 9/1633 700/261 |

OTHER PUBLICATIONS

S. M. LaValle and J. J. Kuffner. Rapidly-exploring random trees: Progress and prospects. In B. R. Donald, K. M. Lynch, and D. Rus, editors, Algorithmic and Computational Robotics: New Directions, pp. 293-306. A K Peters, Wellesley, MA, 2001.

S R Lindemann, S M LaValle. Current Issues in Sampling-Based Motion Planning. In P Dario and R Chatila, editors, Robotics Research, vol. 15, pp. 36-54. Springer, 2005.

R. Fikes and N. Nilsson (1971). STRIPS: a new approach to the application of theorem proving to problem solving. Artificial Intelligence, 2:189-208.

M Svenstrup, T Bak and H J Andersen. Minimising Computational Complexity of the RRT Algorithm: A Practical Approach. IEEE International Conference on Robotics and Automation, 2011.

SMACH library of the ROS (Robot Operating System) environment, found at http://www.ros.org/wiki/smach, last edited on Oct. 14, 2010.

* cited by examiner

SYSTEM AND METHOD FOR QUICK SCRIPTING OF TASKS FOR AUTONOMOUS ROBOTIC MANIPULATION

GOVERNMENT RIGHTS

This invention was made with government support under U.S. Government Contract Number W91CRB-10-C-0126, Autonomous Robotic Manipulation-Software Track. The government has certain rights in the invention.

CROSS-REFERENCE TO RELATED APPLICATIONS

This is a non-provisional patent application of U.S. Provisional Application No. 61/780,903, filed on Mar. 13, 2013, entitled, "Process for quick scripting of tasks for autonomous robotic manipulation."

FIELD OF INVENTION

The present invention is related to robotic manipulation of objects and, more specifically, to a system for quick scripting of tasks for autonomous robotic manipulation.

BACKGROUND OF INVENTION

The present invention is related to autonomous robotic manipulation of objects. Currently, mobile manipulators are often constrained to narrowly defined missions and environments or require constant supervision from a human operator. Despite recent advances in building adaptive and autonomous robots, combining the two remains a difficult challenge. Although analytic solutions provide great precision and repeatability, they suffer from many problems: uncertainty in the sensory input, high sensitivity in sensory-motor calibration, and an inability to perceive and analytically model natural environments. On the other hand, learning systems, which are by design adaptable, suffer from the curse of dimensionality. Learning a task from scratch is impracticable in that the number of possible movement combinations is exponential in the number of degrees of freedom of the robot.

For example, a disadvantage of prior work using such state machines is that they are either composed of rigid actions (e.g., go to end position x, y, z) or involve exploratory planning for a movements between two locations (see, for example, the STRIPS, Stanford Research Institute Problem Solver, architecture) (see the List of Incorporated Cited Literature References, Literature Reference No. 4). Rigid actions do not adapt to obstacles or moving targets. On the other hand, traditional planning suffers from the combinatorial explosion of configurations, particularly for tasks requiring precise coordination between the arms. In most planning methods, like Rapidly-exploring Random Trees (see Literature Reference No. 2), the computation time increases exponentially with the number of degrees-of-freedom of the robot (see Literature Reference Nos. 3 and 5).

Each of the prior methods described above exhibit limitations that make them incomplete. Thus, a continuing need exists for a system using state machines that allows for complex and autonomous robotic operation without the need for computationally extensive planning.

SUMMARY OF INVENTION

Described is a system, method, and computer program product for quick scripting of tasks for autonomous robotic manipulation. The system, for example, includes one or more processors and a memory. The memory is a non-transitory computer-readable medium having executable instructions encoded thereon, such that upon execution of the instructions, the one or more processors performs several operations, such as receiving a selected task from a task file library, the selected task being associated with causing a robot end effector to perform an action with a particular item; transforming the selected task into a state machine; and executing the state machine and, in doing so, causing the robot end effector to perform the selected task.

In another aspect, executing the state machine further comprises operations of selecting goals to accomplish the selected task; integrating perception data into a world model, the world model reflecting a position of the robot end effector in relation to the particular item; selecting path commands to be executed by an Arm Control Module, with the Arm Control Module executing the path commands to control the robot end effector; receiving feedback from sensors regarding the robot end effector; modifying the path commands based on the feedback; and executing and modifying the path commands until completion of the selected task.

In yet another aspect, in executing and modifying the path commands, the path commands are modified based on gravity-compensation torques and movement torques, with the gravity-compensations being added to the movement torques, with the movement torques combining path following and obstacle avoidance.

Further, path following is implemented as a proportional-derivative (PD) controller, and obstacle avoidance is represented as a vector field dependent on position of the robot end effector.

In another aspect, the path commands are encoded as a set of differential equations which represent a flow field.

In another aspect, the path commands are encoded as a dynamic movement primitive.

Finally and as noted above, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
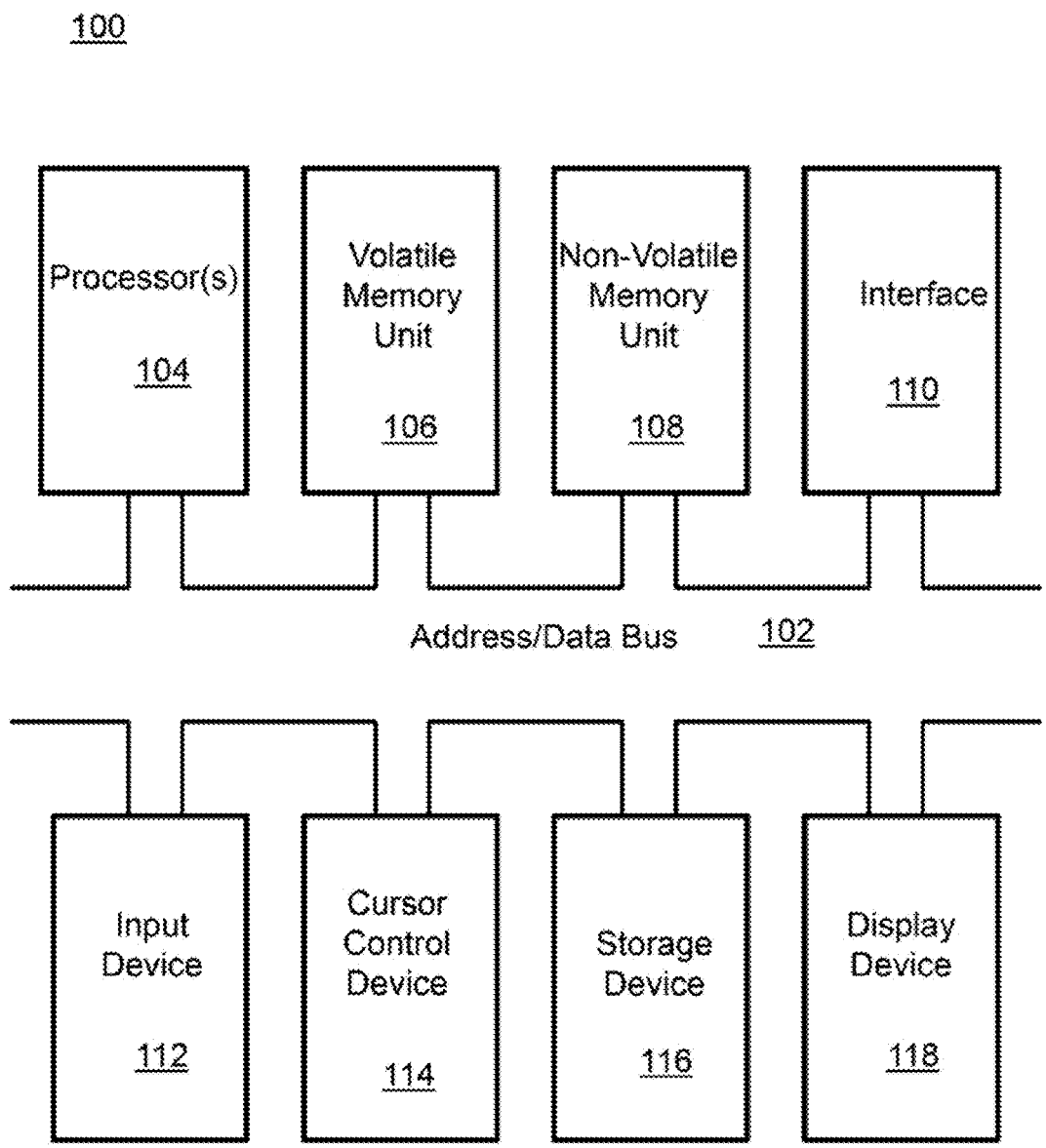
FIG. 1 is a block diagram depicting the components of a system according to the principles of the present invention.

The present invention is related to robotic manipulation of objects and, more specifically, to a system fir quick scripting of tasks for autonomous robotic manipulation. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of incorporated cited literature references is provided. Next, a description of the various principal aspects of the present invention is provided. Subsequently, an introduction provides the reader with a general understanding of the present invention. Finally, specific details of the present invention are provided to give an understanding of the specific aspects.

(1) List of Incorporated Cited Literature References

The following references are cited throughout this application. For clarity and convenience, the references are listed herein as a central resource for the reader. The following references are hereby incorporated by reference as though fully set forth herein. The references are cited in the application by referring to the corresponding literature reference number, as set forth below:
1. H Hoffmann, P Pastor, D-H Park, and S Schaal. Biologically-inspired dynamical systems for movement generation: Automatic real-time goal adaptation and obstacle avoidance. IEEE International Conference on Robotics and Automation, 2009.
2. S. M. LaValle and J. J. Kuffner. Rapidly-exploring random trees: Progress and prospects. In B. R. Donald, K. M. Lynch, and D. Rus, editors, Algorithmic and Com-putational Robotics: New Directions, pages 293-308. A K Peters, Wellesley, M A, 2001.
3. S R Lindemann, S M LaValle. Current Issues in Sampling-Based Motion Planning. In P Dario and R Chatila, editors, Robotics Research, Vol. 15, pp. 36-54. Springer, 2005.
4. R. Fikes and N. Nilsson, "STRIPS: a new approach to the application of theorem proving to problem solving," *Artificial Intelligence*, 2:189-208 (1971).
5. M Svenstrup, T Bak and H J Andersen. Minimising Computational Complexity of the RRT Algorithm: A Practical Approach. IEEE International Conference on Robotics and Automation, 2011.
6. SMACH library of the ROS (Robot Operating System) environment, found at http://www.ros.org/wiki/smach, last edited on Oct. 14, 2010.

(2) Principal Aspects

The present invention has three "principal" aspects. The first is an autonomous robotic manipulation system. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
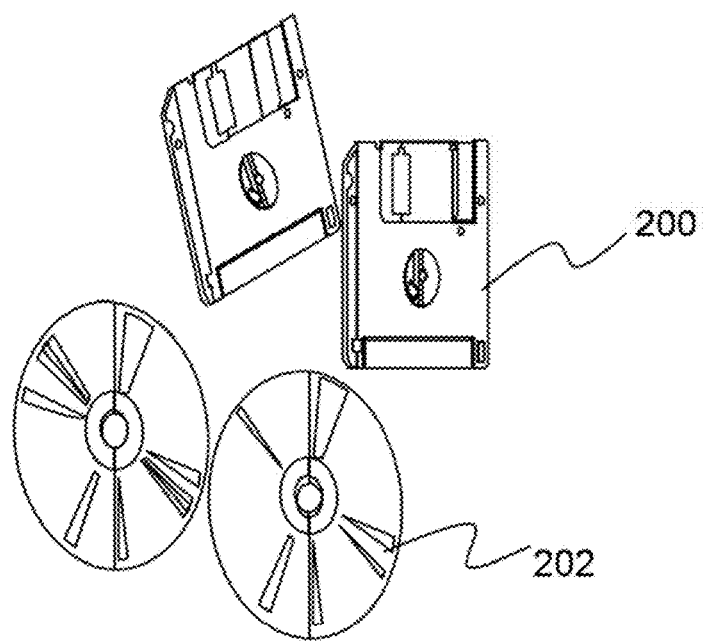
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

As noted above, described is a system for autonomous robotic manipulation. The system allows quick programming of complex robot manipulation tasks. The system implements a scripting language that allows specification of a finite state machine, which controls the sequencing of action primitives. Some elements of the state machine define robot movements as flow fields, which are adaptive, allow obstacle avoidance, and generalize to novel movement targets. Thus, the state machine becomes more flexible for autonomous robotic operation without the need for computationally extensive planning. Action primitives can be, for example, reaching to an object, placing an object, or pressing a button. For transition between actions the state machine carries over the parameters of the robot's internal state (like the joint angles of the robot arm). Thus, actions can be defined relative to each other, e.g., placing an object ten inches to the right. Moreover, the actions are included the sensory feedback within the high-frequency control loop of the robot. This allows the robot to adapt its operations accordingly. For example, the robot can adapt to the weight of an object in the robot's hand by listening to the force-torque sensor at the robot's wrist.

Thus, the system allows for a huge variety of robotic grasping and manipulation tasks, e.g., picking up a hand drill, drilling, inserting a key, and opening a door. Particularly, the system increases the speed of programming new tasks for robots and improves the flexibility of such robots. For example, in terms of speed, the system allows for programming a robot to grasp a new object in one hour versus days. In terms of flexibility, the system allows for adaptation of movements to changing targets, error-recovery, and automatic context-specific action selection. For movement planning, the approach scales well with task complexity: it is linear in the number of degrees-of-freedom of a robot, while most planning methods, like Rapidly-exploring Random Trees (see, for example, Literature Reference No. 2), increase exponentially with this number.

The system can be applied to a variety of applications, such as home, business, and factory (e.g., manufacturing) automation. For example, in the next several years, the number of robots performing soft-manufacturing tasks in cooperation with humans is expected to increase substantially. The system described here would greatly increase the flexibility of such robots and reduce the development time for novel tasks. As the range of tasks performed by robots expands, the ability of robots to manipulate and adapt to novel objects will become ever more important.

(4) Specific Details of the Invention

Figure 3:
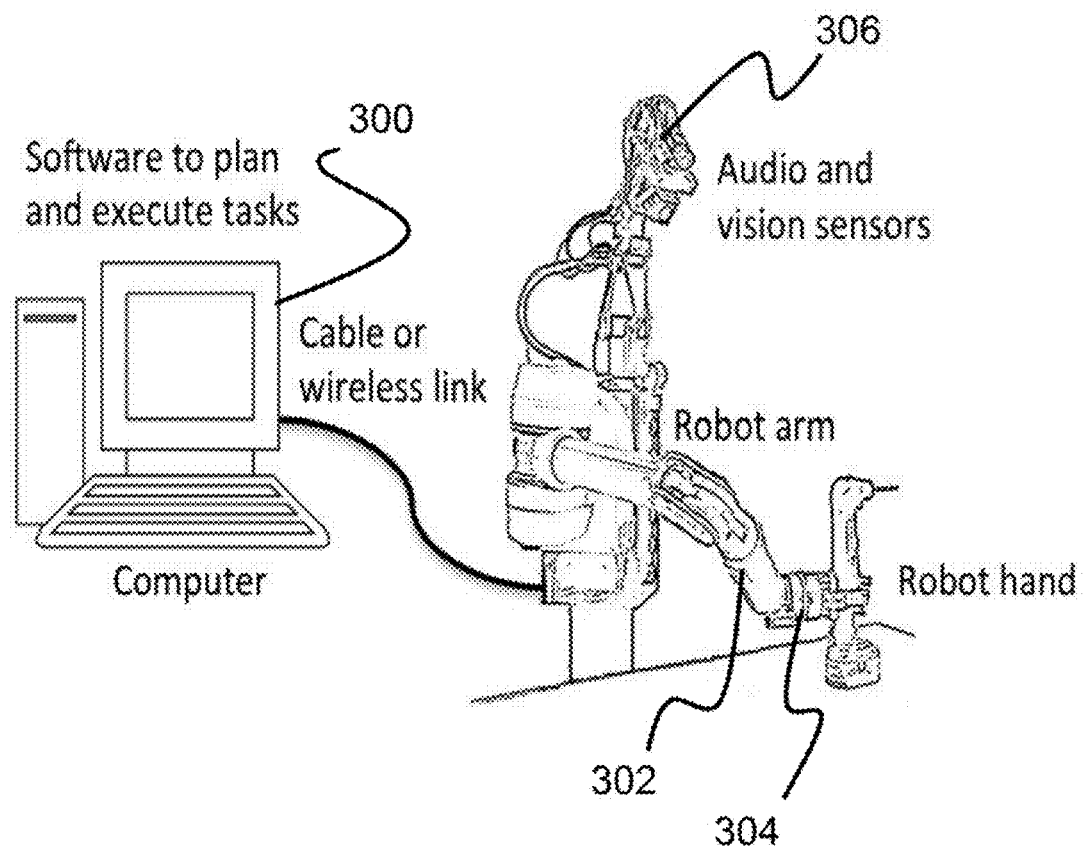
FIG. 3 is an illustration depicting components according to the principles of the present invention.

Basic elements of the system are depicted in FIG. 3, which illustrates a computer system 300, a robotic manipulator 302 (e.g., robot arm) with its corresponding robotic end effector 304 (e.g., robot hand). A sensor head 306 (e.g., audio, tactile and/or vision sensors) is connected with the computer system 300. The computer system 300 implements the code for perception, task planning, and execution according to the principles of the present invention.

The system utilizes action primitives that decompose complex actions into smaller units consisting of movements and/or force applications learned from human demonstration. Action primitives are encoded with dynamical systems that converge to a tactile and/or visual goal state. These primitives are robust against perturbations and flexibly adapt to changes in the goal, which is an attractor in the dynamical system. For each primitive, the system obtains from human demonstration the nominal behavior in task space and confidence boundaries to monitor task progress. Depending on task progress, primitives can be flexibly recruited to allow error recovery.

Within these primitives, the system can leverage the advantages of analytical and learning control solutions using operational-space control methods (impedance control) for palm force and position control and add fingertip and object control through an exploratory learning method called motor babbling. Here, motor babbling explores online the task space of the hand to link its movement with input from visual or tactile feedback. As understood by those skilled in the art, motor babbling is a process of repeatedly performing a random motor command for a short duration which allows the system to autonomously develop an internal model of its self-body and its environment. The adaptability of this online learning, in combination with learning from demonstration in task space, makes the method easy to apply to different manipulators.

Tasks, particularly manipulation tasks, require different approaches to be successful and timely. The system includes an expressive scripting language to organize high-level actions, reason about the completion of a task, and perform corrective actions. Actions for the robot arm, for example, can be composed of behaviors of varying levels of abstraction. At the highest level, the actions attempt to achieve a goal and reported either success or failure. Lower level behaviors perform well-defined functions and could be combined with other behaviors to achieve complex movements.

In operation, a library of movements is required so that a user or the system can select an applicable movement for the goal at hand. To this effect, a library of demonstrated movements can be built using any suitable method or technique. For example, dynamic movement primitives (DMPs), as introduced by Hoffmann et al. (see Literature Reference No. 1), can be utilized to build the library of demonstrated movements ("task file library"). With the task file library in place, the system can perform the operations described herein. Specifically, provided below are further details regarding scriptable task, modular architecture, and action primitives.

(4.1) Scriptable Tasks

To handle all tasks, it would be cumbersome and insufficient to use a single sequence of perception and actuation. Instead, described is a scripting language that specifies when high-level actions are performed. Task execution, represented by traversing a finite state machine, flows from action to action according to the success of an action or the current state of the world. Tasks continue once desired conditions are met or restart entirely after repeated failures. Actions are based on either absolute positions, relative positions to objects, the current end effector, or relative to the desired or actual ending point of a past action. Rotation and translation of the end effector are represented in one or separate coordinate frames. For example, a translation can be specified relative to the end effector's current location and the rotation can be specified to maintain an absolute configuration in Cartesian space.

Figure 4:
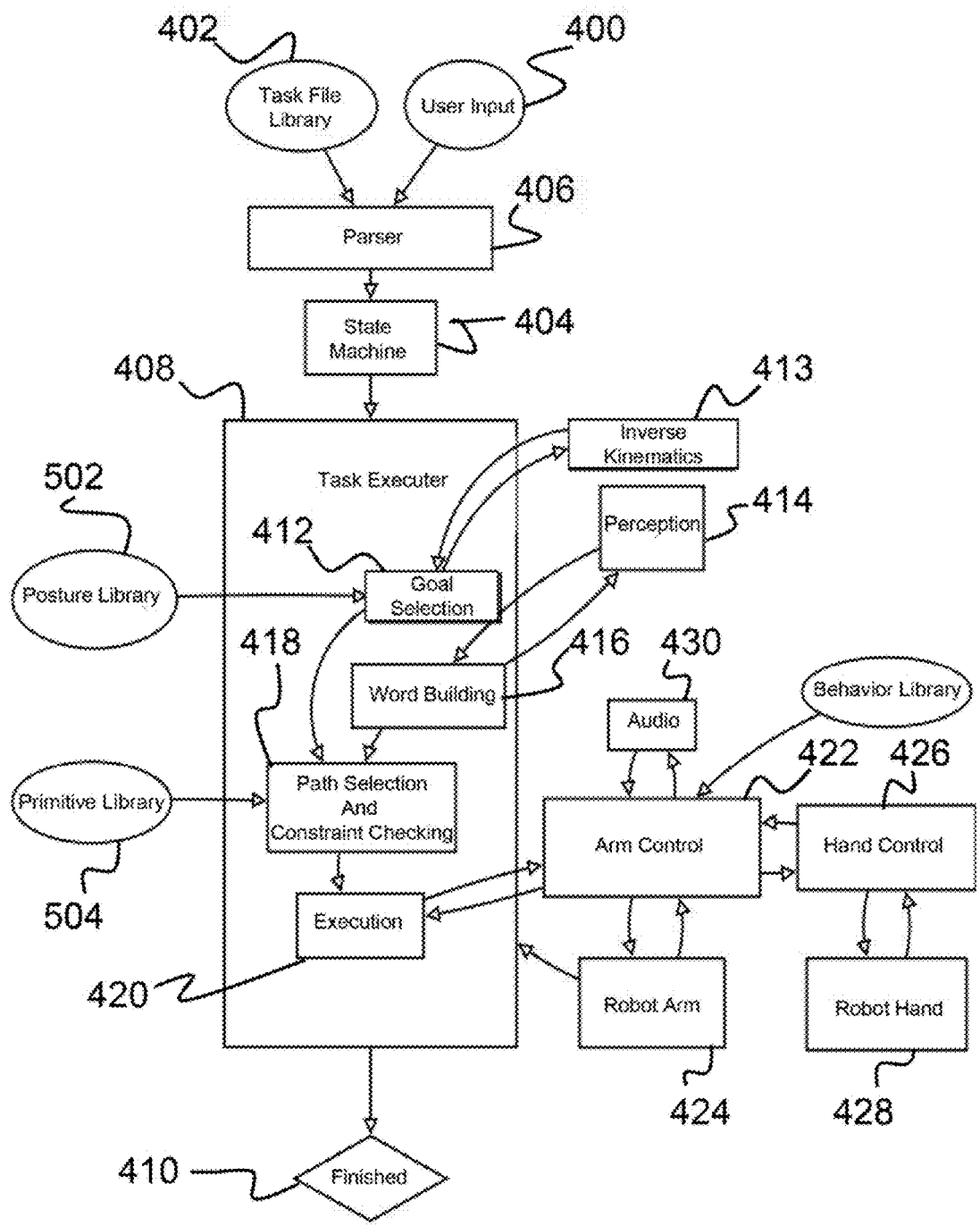
FIG. 4 is a flow chart illustrating information flow for task execution.

FIG. 4, for example, is a flow chart illustrating program flow of a task at a high-level. The task starts with a user 400 selecting a task (e.g., grab a tool) from the Task File library 402. The selected task is then transformed into a state machine 404 by the parser 406 and executed by the Task Executer 408 until finished 410. The task is specified in a task description language developed for a particular application. Entries in the task file have a one-to-one relation to states in the state machine and specify the transition conditions. As understood by those skilled in the art, a parser can be developed to transform the task file into the desired state machine.

The Task Executer 408, in executing the finite state machine 404, performs several iterations of selecting goals 412 (via inverse kinematics 413), integrating perception data 414 into the world model 416, and generating 418 high-level path commands to be executed 420 by the Arm Control module 422.

A non-limiting example of a goal 412 is the movement of the robotic end effector from its current location to a desired configuration while following an action primitive. The perception data 414 is captured from sensors (such as cameras, joint sensors) which provide information relative to the sensor regarding the location of arm links, end effector, and other items in the workspace. The perception data 414 is used to build the world model 416 that describes the locations of all applicable objects in the same frame of reference. Using the world model 416 the Task Executor 408 can generate the path commands 418 that are required to accomplish the selected task without violating constraints, such as collisions.

The Arm Control module 422 interprets commands from the Task Executer 408 and either directly controls the robot 424 (e.g., robot arm) or directs sub-modules (e.g., hand control module 426 and corresponding robot hand 428) to perform tasks. Non-visual sensor 430 readings (audio sensor, torque sensors, strain gauges, etc.) are tightly coupled with actuation. Feedback from the Arm Control 422 or directly from the robot 424 informs the Task Executer 408 on how to progress the finite state machine 404 to complete the selected task. A non-limiting example with respect to torque is provided in further detail below.

Developing a task script involves compiling a text file that sketches out the state machine 404 and the conditions by which it progresses. Each text file is organized to list the states individually along with properties of the actions specified in each state (goal positions, corresponding hand actions, etc.) as well as the conditions for completion and a pointer to the next state. The parser 406 reads the text file, sorts the states and builds up the state machine 404 to best suit the given task. The state machine 404 can be implemented using any applicable state machine components, a non-limiting example of which includes the finite state machine components within the SMACH library of the ROS (Robot Operating System) environment (see, for example, Literature Reference No. 5).

(4.2) Modular Architecture: Simple Actions and Meta Actions

Described below is a modular architecture, with the modules referred to as "Actions". These Actions are implemented by the Task Executor 408 in an attempt to accomplish the selected task. All behaviors are encapsulated into a polymorphic Action construct—the interface allows for custom construction, initialization to be performed before the first execution cycle (or to reset the action), and an execution function called at each control cycle until internal end conditions are met. Actions can be roughly divided into Simple Actions and Meta Actions—enabling small but well-defined functionality or composing several actions into complex behavior, respectively. The task scripts specify which and when high-level Meta Actions are executed.

At a low-level (Simple Action), the robot arm is primarily controlled by torques. The manner in which these torques are calculated depends on each individual action. This organization allows actions to use modified Jacobians, perform joint specific movements, or otherwise bias or restrict torques to the individual joints. Thus, some behaviors can be described as Cartesian forces on the end effector (e.g. for navigation), while other behaviors can be enabled, such as setting a joint space proportional derivative (PD) control or keeping the joint within a specified range of values.

Simple Actions perform tasks or act as triggers and end conditions for Meta Actions. Prime examples of Simple Actions are path-following Dynamic Movement Primitives, the application of force from the end effector, and monitoring sensor responses or durations of actions. Alternatively, actions such as the path following have a natural ending and thus can be executed until completion and actions such as the application of force have no defined end point and are most useful when combined in a Meta Action with a time out or similar action acting as an end condition.

Simple Actions cover a large gamut of capabilities. They include several related families of behaviors, such as path following and the application of Cartesian force. Additional examples of Simple Action behaviors include specialized behaviors such as keeping the hand orientation stable using only the wrist joints, commanding the hand, or alerting the task manager. For the path-following behaviors, paths are generated from demonstrated paths or constructed on the fly. The end effector can apply forces relative to itself, relative to its state when the action is initialized, or in absolute terms; each case in a context where it is most applicable. Examples of specialized actions are the tight coupling of the force/torque sensor and actuation for active compliance, holding a joint position indefinitely, and moving only the wrist joints in order to keep the end effector in a desired orientation.

Meta Actions are composed of other Actions, including other Meta Actions, and have a well-defined process on how the sub-actions are utilized. The majority of Meta Actions derive from constructs for performing sub-actions in sequence and sub-actions in parallel. With these types of Meta Actions, the behavior is defined during construction but initialization and execution of the action is standardized. Both of these Meta Actions contain a list of sub-actions. For actions in series, each item is initialized and executed in turn; for actions in parallel, all sub-actions are initialized at once and executed concurrently. For example, a system can be developed that includes a plurality nested Meta Actions. Non-limiting examples of Meta Actions include actuating the trigger button of a drill while pressing the drill tip against a surface, moving the arm away from detected forces while following a trajectory, and performing a sequence of finger movements to safely move the fingers of the hand into a desired configuration.

With Meta Actions, multiple sub-actions can command torques at the same time, and the architecture needs a strategy for producing final torques from a set of independent and possibly conflicting torques. To facilitate code maintenance, a distinction is made between gravity-compensation torques and movement torques. Gravity-compensation torques, generated for the arm as well as the payload, are added on top of any movement torques. A non-limiting example of a gravity-compensation torque includes counteracting the weight of a tool held in the end effector for a given configuration of the robot. Gravity-compensation torques for each action are tracked independently and simply summed and applied at each joint on top of the Movement torques.

The movement torques combine path following and obstacle avoidance. Path following is implemented as a proportional-derivative (PD) controller, and obstacle avoidance is represented as a vector field dependent on position of the robot hand. The resulting torques are summed. For each joint the minimum and maximum torque values from each individual action is recorded. Then, the sum is limited by the minimum and maximum joint values recorded for each joint, as shown in the example code below:

Let J be a set of Joints,
let A be a set of Actions;
let $T_{aj}$ be the movement torque supplied by a∈A to j∈J
∀j∈J $$R_j = \text{Sum}_{\{\forall a \in A\}}(T_{aj})$$
$$\text{if } R_j < \text{Min}_{\{\forall a \in A\}}(T_{aj})$$
$$R_j = \text{Min}_{\{\forall a \in A\}}(T_{aj})$$
$$\text{if } R_j > \text{Max}_{\{\forall a \in A\}}(T_{aj})$$
$$R_j = \text{Max}_{\{\forall a \in A\}}(T_{aj})$$

To expand the formula with the gravity torques:
Let J be a set of Joints,
let A be a set of Actions;
let $T_{aj}$ be the movement torque supplied by a∈A to j∈J
let $G_{aj}$ be the gravity-compensation torque supplied by a∈A to j∈J ∀j∈J $$R_j = \text{Sum}_{\{\forall a \in A\}}(T_{aj})$$
$$\text{if } R_j < \text{Min}_{\{\forall a \in A\}}(T_{aj})$$
$$R_j = \text{Min}_{\{\forall a \in A\}}(T_{aj})$$

-continued if $R_j > \text{Max}_{\{\forall_a \in A\}}(T_{aj})$ $R_j = \text{Max}_{\{\forall_a \in A\}}(T_{aj})$ $R_j \mathrel{+}= \text{Sum}_{\{\forall_a \in A\}}(G_{aj})$ where $R_j$ is the resulting torque.

Thus, if two actions are applying sufficiently large torques at the same place, in the same direction, only the max is applied. If they oppose each other, then they are added. In this sense, the system allows destructive interference, but disallows constructive interference. For these torque commands, error-recovery movements can also be included. For example, if the arm becomes trapped in local minima during execution, a higher-level task script is triggered for recovery.

(4.3) Action Primitives

To create an action primitive, a demonstrated movement (e.g., back-driving the robot arm, etc.) is desirably performed, with the movement then being encoded as a set of differential equations (which represent a flow field), such as a dynamic movement primitive (DMP). The differential equation equations represent a flow field by generating similar progressions of values for a sets of variables with similar starting and ending values. An example of a DMP was described by Hoffman et al. in Literature Reference No. 1. DMPs are used to represent the movement plan and provide several advantages; including automatic adaptation of a movement to a novel target.

Figure 5:
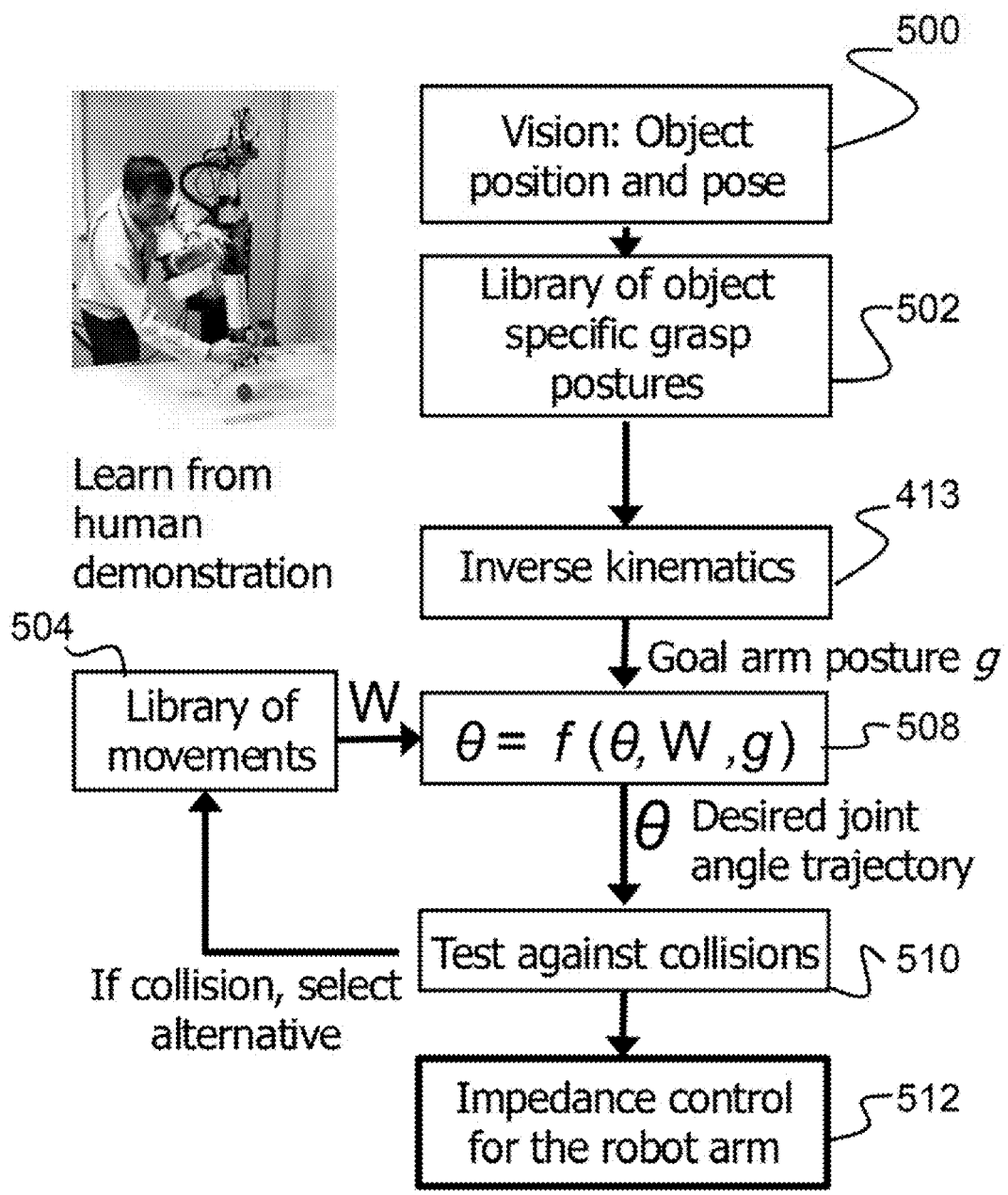
FIG. 5 is a flow chart illustrating that demonstrated movements can be adapted to novel targets.

FIG. 5, for example, is flow chart illustrating that demonstrated movements can be adapted to novel targets. This feature greatly reduces the search space for planning. The movement target can be obtained through vision perception 500, which provides object position and pose. Relative to the coordinate system of an object, a library of grasp postures (posture library 502) can be defined a priori. A user could quickly generate such a library by placing the robot hand into desired grasp postures and recording the hand position and orientation (via inverse kinematics 413) relative to the object. Out of the many possible grasp postures, a grasp posture can be chosen which is reachable by the robot and closest to a default posture, which is the final arm posture of a demonstrated movement.

As depicted in FIG. 5, element 508 is a goal position, namely specific joint values that the dynamic movement primitive tries to attain. Element 502 is the library of grasp postures which describe Cartesian poses relative to the target object. The variables in the formula are as follows: theta is the desired joint trajectory, in the f function, which can be used as the initial starting position and the output of the function transforms theta into the full trajectory, W are the weights of the dynamic movement primitive which determine the trajectory generation (which is what is stored in element 504), g as previously mentioned is the desired values of the joints at the completion of the movement.

In addition to the posture library 502, a library of movement primitives (primitive library 504) can be created. Even for a single action, e.g., reaching for an object, several alternative movements can be defined simply through demonstration.

In movement planning, before executing a movement, the system can optionally test 510 the alternative primitives against collisions with objects (as shown in FIG. 5). As a non-limiting example, the primitive where the robot hand and elbow are furthest away from any obstacles can be selected. Since it may be desirable to choose the best available movement, it can be required to define sufficiently many primitives to account for all possible scenarios (typically two primitives are sufficient).

In this aspect and as a non-limiting example, complex movements like reaching and placing can be represented in joint space (i.e., DMPs were defined in joint space). For short straight movements, a representation in Cartesian space can be utilized. For movement execution, the generated path of a DMP is followed using an impedance controller 512. The path is generated iteratively, and at each step the goal could be changed with perturbations added on the fly. Thus, as can be appreciated, the system allows for autonomous robotic manipulation given the initial libraries.

What is claimed is:

1. A system for autonomous robotic manipulation, the system comprising:
   one or more processors and a memory, the memory having executable instructions encoded thereon, such that upon execution of the instructions, the one or more processors perform operations of:
      learning one or more movement primitives by recording both movement and force applications from human demonstration of a robot end effector, each movement primitive being a path command;
      converting the movement primitive representing both movement and force applications into a differential equation;
      receiving a selected task from a task file library, the selected task being associated with causing the robot end effector to perform an action with a particular item;
      transforming the selected task into a state machine; and
      executing the state machine and, in doing so, causing the robot end effector to perform the selected task.

2. The system as set forth in claim 1, wherein executing the state machine further comprises operations of:
   selecting goals to accomplish the selected task;
   integrating perception data into a world model, the world model reflecting a position of the robot end effector in relation to the particular item;
   selecting path commands to be executed by an Arm Control Module, with the Arm Control Module executing the path commands to control the robot end effector;
   receiving feedback from sensors regarding the robot end effector;
   modifying the path commands based on the feedback; and
   executing and modifying the path commands until completion of the selected task.

3. The system as set forth in claim 2, wherein in executing and modifying the path commands, the path commands are modified based on gravity-compensation torques and movement torques, with the gravity-compensation torques being added to the movement torques, with the movement torques combining path following and obstacle avoidance.

4. The system as set forth in claim 3, wherein path following is implemented as a proportional-derivative (PD) controller, and obstacle avoidance is represented as a vector field dependent on position of the robot end effector.

5. The system as set forth in claim 1, wherein for each movement primitive, the system learns from human demonstration a nominal behavior in task space and confidence boundaries to monitor task progress.

6. The system as set forth in claim 1, wherein before executing the state machine to perform the selected task, the system tests alternative movement primitives against collisions with objects and selects the movement primitive with largest clearance from obstacles.

7. The system as set forth in claim 1, wherein in transforming the selected task into a state machine, the system performs operations of:

compiling a text file that defines the state machine and conditions by which the state machine progresses, wherein each text file is organized to list states individually along with properties of actions specified in each state as well as the conditions for completion and a pointer to a next state; and sorting the states and building the state machine to suit the selected task.

8. A computer program product for autonomous robotic manipulation, the computer program product comprising:
a non-transitory computer-readable medium having executable instructions encoded thereon, such that upon execution of the instructions by one or more processors, the one or more processors perform operations of:
learning one or more movement primitives by recording both movement and force applications from human demonstration of a robot end effector, each movement primitive being a path command;
converting the movement primitive representing both movement and force applications into a differential equation;
receiving a selected task from a task file library, the selected task being associated with causing the robot end effector to perform an action with a particular item;
transforming the selected task into a state machine; and
executing the state machine and, in doing so, causing the robot end effector to perform the selected task.

9. The computer program product as set forth in claim 8, wherein executing the state machine further comprises operations of:
selecting goals to accomplish the selected task;
integrating perception data into a world model, the world model reflecting a position of the robot end effector in relation to the particular item;
selecting path commands to be executed by an Arm Control Module, with the Arm Control Module executing the path commands to control the robot end effector;
receiving feedback from sensors regarding the robot end effector;
modifying the path commands based on the feedback; and
executing and modifying the path commands until completion of the selected task.

10. The computer program product as set forth in claim 9, wherein in executing and modifying the path commands, the path commands are modified based on gravity-compensation torques and movement torques, with the gravity-compensation torques being added to the movement torques, with the movement torques combining path following and obstacle avoidance.

11. The computer program product as set forth in claim 10, wherein path following is implemented as a proportional-derivative (PD) controller, and obstacle avoidance is represented as a vector field dependent on position of the robot end effector.

12. The computer program product as set forth in claim 8, wherein for each movement primitive, a nominal behavior in task space and confidence boundaries to monitor task progress are learned from human demonstration.

13. The computer program product as set forth in claim 8, wherein before executing the state machine to perform the selected task, alternative movement primitives are tested against collisions with objects and the movement primitive with largest clearance from obstacles is selected.

14. The computer program product as set forth in claim 8, wherein transforming the selected task into a state machine further comprises operations of:
compiling a text file that defines the state machine and conditions by which the state machine progresses, wherein each text file is organized to list states individually along with properties of actions specified in each state as well as the conditions for completion and a pointer to a next state; and
sorting the states and building the state machine to suit the selected task.

15. A computer implemented method for autonomous robotic manipulation, the method comprising an act of:
causing one or more processors to execute instructions encoded on a non-transitory computer-readable medium, such that upon execution, the one or more processors perform operations of:
learning one or more movement primitives by recording both movement and force applications from human demonstration of a robot end effector, each movement primitive being a path command;
converting the movement primitive representing both movement and force applications into a differential equation;
receiving a selected task from a task file library, the selected task being associated with causing the robot end effector to perform an action with a particular item;
transforming the selected task into a state machine; and
executing the state machine and, in doing so, causing the robot end effector to perform the selected task.

16. The method as set forth in claim 15, wherein executing the state machine further comprises operations of:
selecting goals to accomplish the selected task;
integrating perception data into a world model, the world model reflecting a position of the robot end effector in relation to the particular item;
selecting path commands to be executed by an Arm Control Module, with the Arm Control Module executing the path commands to control the robot end effector;
receiving feedback from sensors regarding the robot end effector;
modifying the path commands based on the feedback; and
executing and modifying the path commands until completion of the selected task.

17. The method as set forth in claim 16, wherein in executing and modifying the path commands, the path commands are modified based on gravity-compensation torques and movement torques, with the gravity-compensation torques being added to the movement torques, with the movement torques combining path following and obstacle avoidance.

18. The method as set forth in claim 17, wherein path following is implemented as a proportional-derivative (PD) controller, and obstacle avoidance is represented as a vector field dependent on position of the robot end effector.

19. The method as set forth in claim 15, wherein for each movement primitive, a nominal behavior in task space and confidence boundaries to monitor task progress are learned from human demonstration.

20. The method as set forth in claim 15, wherein before executing the state machine to perform the selected task, alternative movement primitives are tested against collisions with objects and the movement primitive with largest clearance from obstacles is selected.

* * * * *